United States Patent
Odier et al.

(10) Patent No.: US 12,410,361 B2
(45) Date of Patent: Sep. 9, 2025

(54) SYNERGISTIC COMBINATION OF SURFACTANTS WITH FRICTION REDUCERS

(71) Applicant: ENERGY SOLUTIONS (US) LLC, The Woodlands, TX (US)

(72) Inventors: Céleste Odier, Princeton, NJ (US); Aymerick Le Bris, Princeton, NJ (US); Mikel Morvan, Pessac (FR)

(73) Assignee: Energy Solutions (US) LLC, The Woodlands, TX (US)

( * ) Notice: Subject to any disclaimer, the term of this patent is extended or adjusted under 35 U.S.C. 154(b) by 0 days.

(21) Appl. No.: 18/385,512

(22) Filed: Oct. 31, 2023

(65) Prior Publication Data

US 2024/0158689 A1   May 16, 2024

Related U.S. Application Data

(60) Provisional application No. 63/421,021, filed on Oct. 31, 2022.

(51) Int. Cl.
*C09K 8/60* (2006.01)
*C09K 8/88* (2006.01)
(Continued)

(52) U.S. Cl.
CPC ............ *C09K 8/602* (2013.01); *C09K 8/882* (2013.01); *E21B 43/26* (2013.01); *C09K 2208/28* (2013.01)

(58) Field of Classification Search
CPC ........ C09K 8/584; C09K 8/594; C09K 8/703; C09K 8/602; C09K 8/68; C09K 8/035;
(Continued)

(56) References Cited

U.S. PATENT DOCUMENTS

| 6,302,209 B1 | 10/2001 | Thompson, Sr. et al. |
| 2012/0285694 A1 | 11/2012 | Morvan et al. |

(Continued)

FOREIGN PATENT DOCUMENTS

| CA | 2828519 C | * 10/2016 | ............... C09K 8/54 |
| CA | 2918022 C | * 10/2019 | ............. C09K 8/602 |

(Continued)

OTHER PUBLICATIONS

International Search Report issued in corresponding International Application No. PCT/US2023/036251 mailed Feb. 29, 2024 (4 pages).

(Continued)

*Primary Examiner* — Zakiya W Bates
(74) *Attorney, Agent, or Firm* — Osha Bergman Watanabe & Burton LLP

(57) ABSTRACT

A surfactant package may include an alpha olefin sulfonate primary surfactant; a betaine or sultaine co-surfactant; water; and optionally one or more solvents and/or co-solvents. A well treatment fluid may include an aqueous fluid, the surfactant package, and a friction reducer. A method of treating a portion of a subterranean formation may include introducing the well treatment fluid into a portion of the subterranean formation. A method of altering the wettability of a reservoir rock in a subterranean formation may include introducing a well treatment comprising the surfactant package into a portion of the subterranean formation.

19 Claims, 1 Drawing Sheet

(51) Int. Cl.
*E21B 43/25* (2006.01)
*E21B 43/26* (2006.01)

(58) Field of Classification Search
CPC ........ E21B 43/16; E21B 43/168; E21B 43/26;
E21B 43/267; E21B 43/25
See application file for complete search history.

(56) References Cited

U.S. PATENT DOCUMENTS

2021/0108129 A1    4/2021  An et al.
2022/0010197 A1*   1/2022  Asirvatham ............. C09K 8/94

FOREIGN PATENT DOCUMENTS

CA    3003865 C  *  4/2020  ........... B01D 17/047
EP    3023476 A1    5/2016

OTHER PUBLICATIONS

Written Opinion issued in corresponding International Application No. PCT/US2023/036251 mailed Feb. 29, 2024 (4 pages).

* cited by examiner

SYNERGISTIC COMBINATION OF SURFACTANTS WITH FRICTION REDUCERS

BACKGROUND

Hydraulic fracturing has always been associated with tremendous volumes of fracture fluid invading the formation matrix resulting in water blockage and reducing relative permeability to gas or oil. This has become more challenging in shale and tight formations because capillary forces have profound impact on water retention and, hence, water recovery and subsequent oil productivity. Surfactants and microemulsions have been applied as flowback additives to lower surface and interfacial tension (IFT) to maximize water recovery. A formulation that results shifts the wettability towards a water-wet condition is desired to maximize oil-relative permeability. The low surface tension then enables pore pressure to overcome the capillary pressure and ease the water flow through the matrix.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a surfactant package that includes an alpha olefin sulfonate primary surfactant; a betaine or sultaine co-surfactant; water; and optionally one or more solvents and/or co-solvents.

In another aspect, embodiments disclosed herein relate to a well treatment fluid that includes an aqueous fluid, a surfactant package that includes an alpha olefin sulfonate primary surfactant; a betaine or sultaine co-surfactant; water; and optionally one or more solvents and/or co-solvents, and a friction reducer.

In another aspect, embodiments disclosed herein relate to a method of treating a portion of a subterranean formation may include introducing a well treatment fluid into a portion of the subterranean formation, where the well treatment fluid includes an aqueous fluid, a surfactant package that includes an alpha olefin sulfonate primary surfactant; a betaine or sultaine co-surfactant; water; and optionally one or more solvents and/or co-solvents, and a friction reducer.

In yet another aspect, embodiments disclosed herein relate to a method of altering the wettability of a reservoir rock in a subterranean formation that includes introducing a well treatment comprising a surfactant package into a portion of the subterranean formation, where the surfactant package includes an alpha olefin sulfonate primary surfactant; a betaine or sultaine co-surfactant; water; and optionally one or more solvents and/or co-solvents.

Other aspects and advantages of the claimed subject matter will be apparent from the following description and the appended claims.

DETAILED DESCRIPTION

Figure 1:
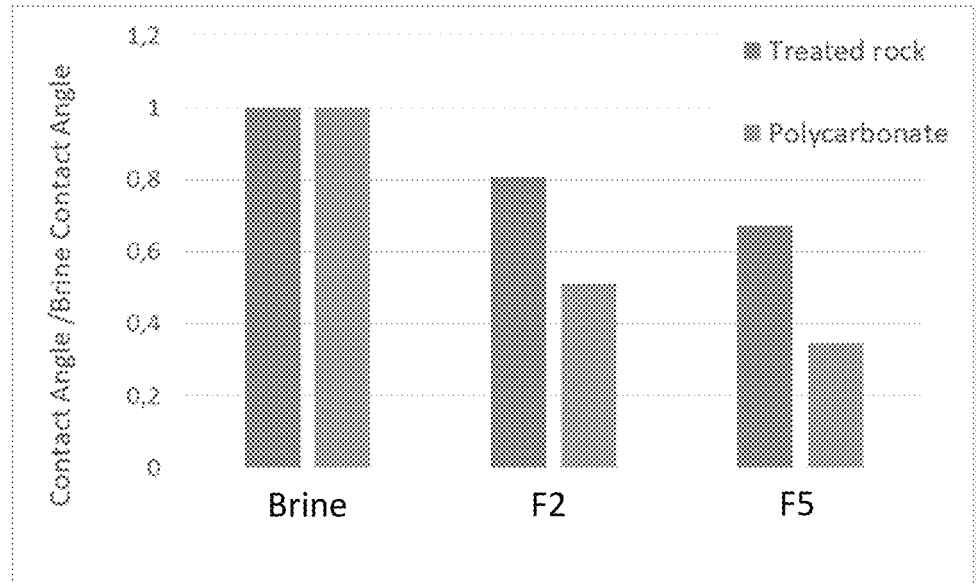
FIG. 1 shows normalized contact angles on a crude oil treated rock sample and a polycarbonate substrate at 60° C. immerged in decane.

In one aspect, embodiments disclosed herein relate to surfactant packages (of more than one surfactant), as well as well treatment fluids containing such surfactant packages. The surfactant packages may be used to alter the wettability of a reservoir rock, for example an oil-wet rock, during stimulation operations such as fracturing and the like. For example, such alteration may be particularly useful in tight reservoir rock to shift the rock towards water-wet conditions. By altering the rock towards being water-wet, the capillary forces favor the spontaneous imbibition of water into the rock. This imbibition of water may advantageously replace the oil into the pore space and desorb/solubilize oil films or molecules adsorbed on the rock surface. By replacing the oil, the water imbibition may also result in oil "counter-current" production. In other words, the oil being pushed inside the rock matrix by capillary forces thereby forces the oil to flow in the opposite direction towards the fracture.

Surfactant Package

In one or more embodiments, the surfactant package of the present disclosure may include an anionic primary surfactant, specifically an alpha olefin sulfonate primary surfactant; and one or more zwitterionic co-surfactant(s), specifically betaine and or sultaine co-surfactant(s).

Alpha olefin sulfonates have a structure according to formula (I)

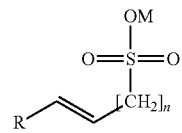

where R is an alkyl group having 10 to 18 carbon atoms, n is 1 or 2, and M is a sodium, potassium, ammonium or an organic amine. In one or more embodiments, the alpha olefin sulfonate primary surfactant has a total alpha olefin chain length ranging between 14-18 carbons. It is also envisioned that the alpha olefin sulfonates may include hydroxyalkane sulfonates therein.

In one or more embodiments, the betaine or sultaine co-surfactant has the formula (II):

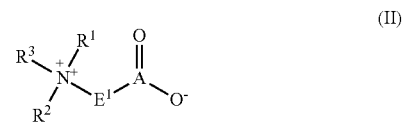

wherein A is a C or SO, $E^1$ is a linear or branched, saturated or unsaturated, and optionally substituted hydrocarbon chain having 1 to 10 carbon atoms, $R^1$ and $R^2$ are selected from alkyl or hydroxyalkl groups of from 1 to about 4 carbon atoms, and $R^3$ is a linear or branched, saturated or unsaturated alkyl chain having up to 22 carbon atoms or is —$(CH_2)_n$ NHC(O)—$R^4$, where $R^4$ is a linear or branched, saturated or unsaturated alkyl chain having up to 21 carbon atoms and n ranges from 1 to 6.

It is also envisioned that more than one betaine or sultaine co-surfactants, i.e. two distinct betaine or sultaine co-surfactants, may be used in the surfactant package. For example, a first co-surfactant may be a straight betaine and the second co-surfactant may be a fatty alkyl amidopropyl sultaine, but it is also envisioned that straight betaines may be used in combination with straight sultaines.

In one or more embodiments, the alpha olefin sulfonate primary surfactant and betaine or sultaine co-surfactant(s) are present at a weight ratio between the two ranging from about 0.5 to 1.5. Moreover, the total surfactant content in the surfactant package may range from 10 to 35 wt %.

In addition to the surfactants, the surfactant package may be formulated with water. In one or more embodiments, in addition to the water, the surfactant package may also optionally include solvents such as alcohol (including methanol, ethanol, isopropanol), glycols, and glycol ethers, and co-solvents such as C1-C6 alcohol alkoxylates (such as 0 to 4 PO groups and 1 to 8 EO groups), and combinations thereof.

When included, solvents may be included in an amount up to 5 to 30% With respect to the co-solvent, the co-solvent present at 10 wt % to 100 wt %, relative to the surfactant content present in the surfactant package.

Well Treatment Fluid

In one or more embodiments, the surfactant package described above may be incorporated into a well treatment fluid, such as for example a fracturing fluid. The well treatment fluid may include, in addition to the surfactant package, an aqueous fluid; and a friction reducer.

In some embodiments, the surfactant package described herein should be included in well treatment fluid in an amount sufficient to provide the desired alteration of wettability. For example, within the well treatment fluid, the alpha olefin sulfonate primary surfactant and the betaine or sultaine co-surfactant(s) may be present in a combined amount (i.e., active content) ranging from about 0.2 g/L to 10 g/L For example, the alpha olefin sulfonate primary surfactant and the betaine or sultaine co-surfactant(s) may be present in a combined amount that is at least about 0.2, 0.5, 1, 2, 3, or 5 g/L and/or at most about 5, 8, or 10, g/L, where any lower limit may be used in combination with any upper limit. In one or more embodiments, the alpha olefin sulfonate primary surfactant may be present in an amount that is at least about 0.05, 0.1 0.5, 1, 2.5 or 5 g/L and/or at most about 3, 5, or 7.5 g/L, where any lower limit may be used in combination with any upper limit. In one or more embodiments, the betaine or sultaine co-surfactant(s) may be present in a combined amount that is at least about 0.05, 0.1, 0.5, 1, 2.5 or 5 g/L and/or at most about 3, 5, or 7.5 g/L, where any lower limit may be used in combination with any upper limit.

The friction reducer may be a water soluble polymer or copolymer, as would appreciated by those of ordinary skill in the art. For example of at least one or more polymers or copolymers of (meth)acrylamide, N,N-dimethyl (meth)acrylamide (DMF), N-vinyl acetamide, N-vinyl formamide, acrylonitrile (including hydrolyzed products of acrylonitrile residues), acrylonitrile-dimethyl amine reaction products, anionic monomers such as (meth)acrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide, and salts thereof, cationic monomers such as (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyl-diallylamine, and mixtures thereof.

The water soluble polymers described herein typically have a molecular weight sufficient to provide desired rheological properties in the aqueous solutions. In some embodiments, the water soluble polymers described herein may have a molecular weight selected to provide a desirable level of friction reduction. As a non-limiting example, the weight average molecular weight of the present copolymers may be in the range of from about 1,000,000 to about 20,000,000, as determined using intrinsic viscosity. Those of ordinary skill in the art will recognize that friction reducing copolymers having molecular weights outside the listed range may still provide some degree of friction reduction in an aqueous solutions.

In some embodiments, the aqueous solution containing the surfactant package and optionally the water soluble polymers described herein can be included in any aqueous treatment fluid used in subterranean treatments to alter wettability and/or reduce friction. In particular, the surfactant package may be included in the treatment fluid as a flowback additive to maximize water recovery by altering the wettability to shift the rock towards water-wet condition and to lower surface and interfacial tension (IFT). Such subterranean treatments may include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where wettability alteration may be desired.

In some embodiments, the water used in the well treatment fluids (as well as the surfactant package) described herein can be freshwater, saltwater (e.g., water containing one or more salts dissolved therein), brine (e.g., produced from subterranean formations), seawater, pit water, pond water or the like, or combinations thereof. Generally, the water used may be from any source, provided that it does not contain an excess of compounds that may adversely affect other components in the aqueous solution.

In some embodiments, the water soluble polymers described herein should be included in well treatment fluid in an amount sufficient to provide the desired reduction of friction. For example, a water soluble polymer described herein may be present in an amount that is at least about 0.0025%, in some cases at least about 0.003%, in other cases at least about 0.0035% and in some instances at least about 0.05% by weight of the aqueous solution and can be up to about 5% or in some cases up to about 4%, in some cases up to about 3%, in other cases up to about 2%, in some instances up to about 1%, in other instances up to about 0.02%, in some situations up to less than about 0.1%, in other situations, up to about 0.09%, and in specific situations, up to about 0.08% by weight of the aqueous solution. The amount of the water-soluble polymers included in the aqueous solution can be any value or range between any of the values recited above.

Additional additives can, in some embodiments, be included in the well treatment fluids described herein as deemed appropriate by one of ordinary skill in the art, with the benefit of this disclosure. Examples of such additives include, but are not limited to, corrosion inhibitors, proppant particulates, acids, fluid loss control additives, acids, and surfactants.

In one or more embodiments, the well treatment fluids (and surfactant package) described herein can be used in any subterranean treatment where an alteration of wettability, and the reduction of friction, is desired. Such subterranean treatments include, but are not limited to, drilling operations, stimulation treatments (e.g., fracturing treatments, acidizing treatments, fracture acidizing treatments), and completion operations. Those of ordinary skill in the art, with the benefit of this disclosure, will be able to recognize a suitable subterranean treatment where wettability alteration may be desired.

As mentioned above, the surfactant packages may be used to alter the wettability of a reservoir rock, for example an oil-wet rock, during stimulation operations such as fracturing and the like. It is envisioned that the surfactant package may be pumped downhole subsequent to a fracturing operation for flowback operations, or it may be present in the fracturing fluid and pumped downhole during a fracturing operation to achieve the wettability alteration for a flowback operation after the fracturing. For example, such alteration may be particularly useful in tight reservoir rock, such as shales, to shift the rock towards water-wet conditions. By altering the rock towards being water-wet, the capillary forces favor the spontaneous imbibition of water into the rock. This imbibition of water may advantageously replace the oil into the pore space and desorb/solubilize oil films or molecules adsorbed on the rock surface. By replacing the oil, the water imbibition may also result in oil "counter-current" production. In other words, the water being pushed inside the rock matrix by capillary forces thereby forces the oil to flow in the opposite direction towards the fracture. To achieve this counter-current imbibition, it may be desirable to reduce IFT (Interfacial Tension) to an amount that is still sufficient in order to maintain capillary forces strong enough to promote imbibition. For example, a decrease of about 1 order of magnitude or even more may be desirable since it slightly improves the respective mobility of each phase. Generally, the native interfacial tension of oil with brine is around 20 mN/m. When including a surfactant package of the present disclosure in brine, the interfacial tension between oil and the brine with the surfactants therein may be less 0.5 mN/m.

EXAMPLES

Various surfactant packages (shown in Table 2 below) were formulated for assessment of solubility in brine and contact angle. The surfactants used include: Rhodacal A246L (an alpha olefin sulfonate), Mackam CBS50 (a cocamidopropyl hydroxysultaine), Mackam LHS-E (lauryl hydroxysultaine), Mackam LSB50 (lauramidopropyl hydroxysultaine), Mackam CET (cetyl betaine), Fentacare B S1618 (C16-18 straight betaine), all of which are available from Solvay. The brine used in the examples is shown in Table 1

TABLE 1

| Component | Dissolved hydrated solid(g/L) | Salinity TDS(g/L) |
|---|---|---|
| NaCl | 0.84 | 0.84 |
| KCl | 0.06 | 0.06 |
| CaSO4 | 0.54 | 0.64 |
| CaCl2, 2H2O | 0.81 | 0.52 |
| MgSO4, 7H2O | 0.62 | 0.30 |
| Dissolved solid | 2.87 | |
| Total Salinity | | 2.36 |
| Ca2+/Na+ | | 1.16 |
| Mg+/Na+ | | 0.19 |
| R+ = Ca + Mg/ (Na + K + Ca + Mg) | | 0.56 |

The surfactant packages were diluted to 2500 ppm in the brine detailed in Table 1. A formulation was considered soluble if it remains homogeneous and clear for 24 hours at 60° C.

The contact angle measurements are performed using a Biolin Theta from Biolin Scientifics, using a liquid/liquid measuring chamber, with regulated temperature at 60° C. using a water bath. In order to perform contact angle measurement of the formulation immerged in oil, decane (C10) was used to model the crude oil. Preliminary measurements of contact angles are performed on polycarbonate plates, to model oil wet substrate, without suffering from rock heterogeneity. On polycarbonate plate, in oil the brine alone exhibits a contact angle of 130°. The formulations based on sulfonate and zwitterionic surfactants alter the wettability of the polycarbonate substrate, and the contact angle decreases from 130° C. (oil wet) to under 90° C. (water wet). The contact angles on polycarbonate are presented in Table 2. The surfactant concentrations reported in Table 2 correspond to a 100% active level.

TABLE 2

| Formulation | Surfactant 1 | [TA1] (g/L) | Surfactant 2 | [TA2] (g/L) | Surfactant 3 | [TA3] (g/L) | Solubility 60 C. | Contact Angle |
|---|---|---|---|---|---|---|---|---|
| 1 | Rhodacal A246L | 2 | Mackam CBS50 | 0.5 | — | — | Yes | 76 |
| 2 | Rhodacal A246L | 1.12 | Mackam CBS50 | 1.38 | — | — | Yes | 70 |
| 3 | Rhodacal A246L | 2 | Mackam LHS-E | 0.5 | — | — | Yes | 99 |
| 4 | Rhodacal A246L | 1.12 | Mackam LSB50 | 1.38 | — | — | Yes | 84 |
| 5 | Rhodacal A246L | 1.25 | Mackam CBS50 | 0.625 | Mackam CET | 0.625 | Yes | 48 |
| 6 | Rhodacal A246L | 1.25 | Mackam CBS50 | 0.625 | Fentacare BS1618 | 0.625 | Yes | 84 |
| 7 | Rhodacal A246L | 1 | Mackam CBS50 | 0.75 | Mackam CET | 0.75 | Yes | 59 |
| 8 | Rhodacal A246L | 1.25 | Mackam LSB50 | 0.625 | Mackam CET | 0.625 | Yes | 71 |
| 9 | Rhodacal A246L | 0.5 | Mackam LSB50 | 1 | Mackam CET | 1 | Yes | 74 |
| 10 | Rhodacal A246L | 1.25 | Mackam LSB50 | 1 | Mackam CET | 0.25 | Yes | 70 |

As shown in Table 2, the addition of a second zwitterionic surfactant further improves the wettability. In particular, as shown in Table 2, a combination of Mackam CBS 50 (cocoamidopropyl sultaine) and Mackam CET (cetylbetaine straight, distribution C14-18) with the primary surfactant gives the lowest contact angle)(<50° on a polycarbonate substrate.

Wettability is best determined through contact angle measurements. A formulation that results in restoring the wettability to shift the rock towards water-wet condition is desired to maximize oil-relative permeability. To validate the formulations ability to alter the wettability in downhole conditions, measurements of contact angles are performed on aged reservoir rock samples (oil wet) protocol inspired from Langmuir 34 (36), 10650-10658 (2018).

A reservoir rock sample was obtained to obtain contact angle measurements in oil on a treated rock sample. The rock sample was initially water wet. To restore the wettability to oil wet (simulating downhole), the sample plugs are immerged in crude oil for 3 days at 100° C., and then dried in the oven at 100° C. for 2 days, and rinsed with decane at ambient temperature. The measurement of contact angle is then performed using the liquid cell, immersed in decane, at 60° C. The results, showing the reduction in contact angle on both a polycarbonate substrate and the treated rock, are shown in FIG. 1. The treated rock and polycarbonate display contact angles with brine (without surfactant) of 150° and 130°, respectively. The treated rock with brine alone shows the efficiency of the wettability restoration pre-treatment, as the untreated rock sample was water wet, and the contact angle measurement on the sample using just brine was 150° indicating the sample is now oil-wet. Both formulations (formulation 2 and 5) reduce the contact angle on both treated rock and polycarbonate, relative to the contact angle measured with brine alone. The wettability is improved with additional betaine in the formulation (formulation 5). Thus, FIG. 1 demonstrates that the contact angle on both polycarbonate and treated rock is reduced in oil for the surfactant packages of the present disclosure.

The interfacial tension between formulation 2 at 2.5 g/L in brine and decane is measured using a dataphysics Spinning drop tensiometer, at 60° C. At 4000 rpm, a low interfacial tension (0.2-0.3 mN/m) was measured between formulation 2 and decane.

Comparative Example

Figure 2:
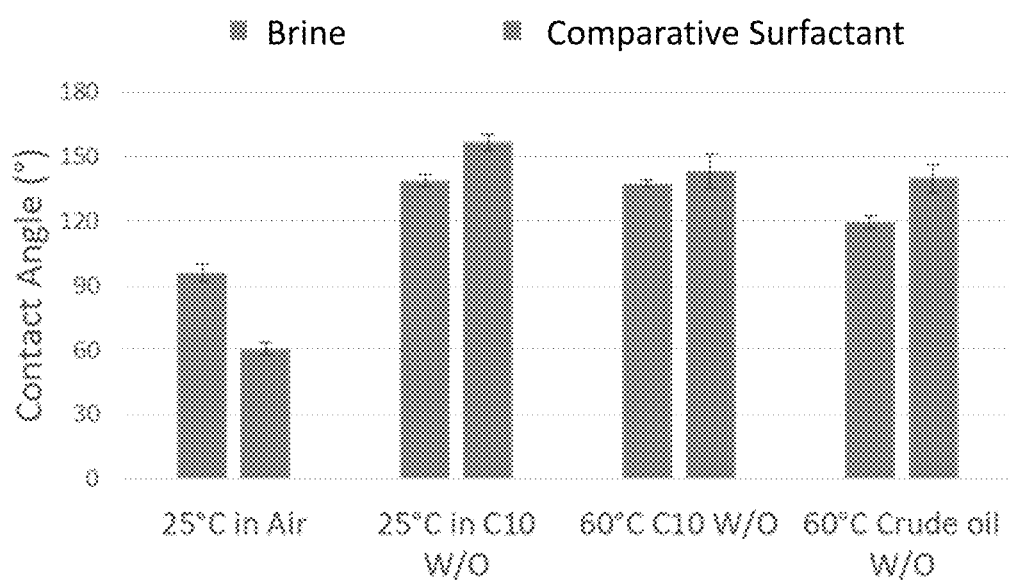
FIG. 2 shows contact angles on a polycarbonate substrate in air, decane, and crude oil.

A comparative surfactant package was used to demonstrate that change in contact angle measurements at an air-water interface do not necessarily reflect contact angle measurements at an oil-water interface (using both decane and crude oil). FIG. 2 shows that while there was a reduction contact angle at the air-water interface with the comparative surfactant solution, this is not the case at the oil-water interface. In contrast, the inventive formulations shown above do possess a reduced contact angle in an oil-water interface.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A surfactant package, comprising:
   an alpha olefin sulfonate primary surfactant;
   a betaine or sultaine co-surfactant; and
   water;
   wherein the alpha olefin sulfonate primary surfactant and betaine or sultaine co-surfactant are present at a weight ratio ranging from 0.5 to 1.5, and
   wherein the surfactant package exhibits a contact angle of less than 71° in decane on polycarbonate at 60° C.

2. The surfactant package of claim 1, wherein the alpha olefin sulfonate primary surfactant and the betaine or sultaine co-surfactant are present in a combined amount ranging from 10 to 35 wt %, relative to the surfactant package.

3. The surfactant package of claim 1, wherein the alpha olefin sulfonate primary surfactant has a total alpha olefin chain length ranging between 14-18 carbons.

4. The surfactant package of claim 1, wherein the betaine or sultaine co-surfactant has the formula (II):

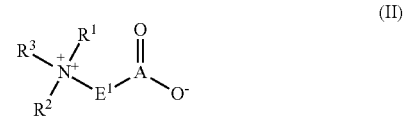

wherein A is a C or SO, $E^1$ is a linear or branched, saturated or unsaturated, and optionally substituted hydrocarbon chain having 1 to 10 carbon atoms, $R^1$ and $R^2$ are selected from alkyl or hydroxyalkl groups of from 1 to about 4 carbon atoms, and $R^3$ is a linear or branched, saturated or unsaturated alkyl chain having up to 24 carbon atoms or is $—(CH_2)_n\ NHC(O)—R^4$, where $R^4$ is a linear or branched, saturated or unsaturated alkyl chain having up to 21 carbon atoms and n ranges from 1 to 6.

5. The surfactant package of claim 1, wherein the betaine or sultaine co-surfactants comprises two distinct betaine or sultaine co-surfactants.

6. A well treatment fluid, comprising:
   an aqueous fluid;
   a surfactant package according to claim 1; and
   a friction reducer.

7. The well treatment fluid of claim 6, wherein the alpha olefin sulfonate primary surfactant and the betaine or sultaine co-surfactant are present in a combined amount ranging from 0.2 g/L to 10 g/L.

8. The well treatment fluid of claim 6, wherein the alpha olefin sulfonate primary surfactant is present in an amount ranging from 0.05 to 7.5 g/L.

9. The well treatment fluid of claim 6, wherein the betaine or sultaine co-surfactant is present in an amount ranging from 0.05 to 7.5 g/L.

10. The well treatment fluid of claim 6, wherein the friction reducer is a water soluble polymer.

11. The well treatment fluid of claim 6, wherein the friction reducer comprises a polymer or copolymer of one or more of (meth)acrylamide, N,N-dimethyl (meth)acrylamide (DMF), N-vinyl acetamide, N-vinyl formamide, acrylonitrile (including hydrolyzed products of acrylonitrile residues), acrylonitrile-dimethyl amine reaction products, anionic monomers, (meth)acrylic acid, 2-acrylamido-2-methylpropanesulfonic acid (AMPS), vinyl sulfonic acid, styrene sulfonic acid, maleic acid, sulfopropyl acrylate, methacrylate, olymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, and phosphonomethylated acrylamide, and salts thereof, cationic monomers, (meth)acrylamidopropyltrimethyl ammonium halides, (meth)acryloyloxyethyltrimethyl ammonium halides, (meth)acryloyloxyethyltrimethyl ammonium methyl sulfate, diallyl dimethyl ammonium halides, diallylamine, methyldiallylamine, and mixtures thereof.

12. The well treatment fluid of claim 6, wherein the friction reducer is present in an amount ranging from 0.0025 wt % to 5 wt %, relative to the well treatment fluid.

13. A method of treating a portion of a subterranean formation comprising: introducing a well treatment fluid of claim 11 into a portion of the subterranean formation.

14. A method of altering the wettability of a reservoir rock in a subterranean formation, comprising: introducing a well treatment comprising the surfactant package of claim 1 into a portion of the subterranean formation.

15. The surfactant package of claim 1, further comprising one or more solvents, co-solvents, or combinations thereof.

16. The surfactant package of claim 15, wherein the solvent is present in an amount ranging from 5 to 30 wt %.

17. The surfactant package of claim 16, wherein the solvent is selected from the group consisting of alcohols, glycols, glycol ethers, and combinations thereof.

18. The surfactant package of claim 15, wherein the co-solvent is present in an amount ranging from 10 wt % to 100 wt %, relative to the surfactant content present in the surfactant package.

19. The surfactant package of claim 18, wherein the co-solvent is a C1-C6 alcohol alkoxylate.

* * * * *